(12) United States Patent
Hu et al.

(10) Patent No.: US 9,485,330 B2
(45) Date of Patent: Nov. 1, 2016

(54) WEB BROWSER OPERATION METHOD AND SYSTEM

(71) Applicant: TENCENT TECHNOLOGY (SHENZHEN) COMPANY LIMITED, Shenzhen (CN)

(72) Inventors: Bo Hu, Shenzhen (CN); Sha Mo, Shenzhen (CN); Tingyong Tang, Shenzhen (CN); Ying Huang, Shenzhen (CN); Xi Wang, Shenzhen (CN); Cheng Feng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 516 days.

(21) Appl. No.: 14/013,261

(22) Filed: Aug. 29, 2013

(65) Prior Publication Data

US 2014/0032652 A1    Jan. 30, 2014

Related U.S. Application Data (63) Continuation of application No. PCT/CN2013/079975, filed on Jul. 24, 2013.

(30) Foreign Application Priority Data

Jul. 30, 2012   (CN) .......................... 2012 1 0267018

(51) Int. Cl.
*H04L 29/06* (2006.01)
*H04L 29/08* (2006.01)
*G06F 17/30* (2006.01)

(52) U.S. Cl.
CPC ......... *H04L 67/42* (2013.01); *G06F 17/30899* (2013.01); *H04L 67/02* (2013.01)

(58) Field of Classification Search
CPC .......... G06F 17/3061–17/30899; H04L 67/42
See application file for complete search history.

(56) References Cited

U.S. PATENT DOCUMENTS

| | | | | |
|---|---|---|---|---|
| 2007/0118514 A1* | 5/2007 | Mariappan | ........ | G06F 17/30864 |
| 2009/0254425 A1* | 10/2009 | Horowitz | .......... | G06F 17/30864 705/300 |

(Continued)

FOREIGN PATENT DOCUMENTS

| | | |
|---|---|---|
| CN | 1342290 A | 3/2002 |
| CN | 101001290 A | 7/2007 |

(Continued)

OTHER PUBLICATIONS

WO 2000/21232 by Gopalakrishnan et al.*

(Continued)

*Primary Examiner* — Wing F Chan
*Assistant Examiner* — Raji Krishnan
(74) *Attorney, Agent, or Firm* — Anova Law Group, PLLC (57) ABSTRACT

A browser operation and control method is provided for a server and a client having a browser. The server receives a query request message from the client, and the query request message contains a character string converted by the client from voice information inputted by a user of the client. The server obtains control information for operating the browser based on the character string in the query request message, and the control information indicating one of a plurality results provided by the server including a direct URL based on the character string, a direct operation command based on the character string, and a search result page based on the character string. The server sends a query response message containing the control information to the client such that the client operates the browser based on the control information in response to the voice information inputted by the user.

11 Claims, 5 Drawing Sheets

(56) References Cited

U.S. PATENT DOCUMENTS

| | | | |
|---|---|---|---|
| 2012/0136848 A1 | 5/2012 | Hanyu | |
| 2012/0173565 A1 | 7/2012 | Jacobs et al. | |
| 2012/0239731 A1* | 9/2012 | Shyamsunder | G06F 17/30876 709/203 |
| 2013/0283168 A1* | 10/2013 | Brown | G06F 3/165 715/728 |
| 2014/0365998 A1* | 12/2014 | Koul | G06F 3/0481 717/113 |

FOREIGN PATENT DOCUMENTS

| | | | |
|---|---|---|---|
| CN | 101257538 A | 9/2008 | |
| KR | 20020010259 A | 2/2002 | |
| KR | 20020030156 A | 4/2002 | |
| KR | 20030046494 A | 6/2003 | |
| RU | 2379745 C2 | 1/2010 | |
| WO | 0021232 A2 | 4/2000 | |

OTHER PUBLICATIONS

The State Intellectual Property Office of the People's Republic of China (SIPO) Office Action 1 for 201210267018.9 Feb. 10, 2015.
The State Intellectual Property Office of the People's Republic of China (SIPO) Office Action 2 for 201210267018.9 Sep. 14, 2015.
The World Intellectual Property Organization (WIPO) International Search Report for PCT/CN2013/079975 Oct. 31, 2013.
Korea Intellectual Property Office (KIPO) Office Action 1 for 2016002605310 Jan. 12, 2016.
The State Intellectual Property Office of the People's Republic of China (SIPO) Office Action 2 for 201210267018.9 Feb. 24, 2016.
Patent Office of the Russian Federation (Rospatent) Office Action for Application No. 2015101906/08(002851) May 20, 2016 pp. 1-14.

* cited by examiner

WEB BROWSER OPERATION METHOD AND SYSTEM

CROSS-REFERENCES TO RELATED APPLICATIONS

This application is a continuation of PCT Patent Application No. PCT/CN2013/079975, filed on Jul. 24, 2013, which claims priority of Chinese Patent Application No. 201210267018.9, filed on Jul. 30, 2012, the entire contents of all of which are incorporated by reference herein.

FIELD OF THE INVENTION

The present invention generally relates to communication technologies and, more particularly, to web browser operation and control methods and systems.

BACKGROUND

With the rapid development of web browser (commonly referred to as browser) technology, browsers are widely used by users. A browser includes one or more functionalities, so a user can control the browser to perform the functionalities included in the browser, or can control the browser to visit web pages, etc.

For example, the user can manually enter into the browser a Universal Resource Locator (URL) of a webpage to be visited, and then operates the browser to access the selected webpage based on the URL. For another, opening a bookmark page is a functionality of the browser and a corresponding operation button is included in the browser to perform that functionality. The user can manually click the operation button in the browser to submit a corresponding operation command to the browser. After receiving the corresponding operation command, the browser performs the command to open the bookmark page.

However, the current browser technology has following limitations: the user needs to manually control the browser to perform the functionalities included in the browser; or to manually control the browser to visit the webpage to be visited. This can limit the operation efficiency of the browser significantly, negatively impacting the user's experience. The disclosed methods and systems are directed to solve one or more problems set forth above and other problems.

BRIEF SUMMARY OF THE DISCLOSURE

One aspect of the present disclosure includes a browser operation and control method between a server and a client having a browser. The server receives a query request message from the client, and the query request message contains a character string converted by the client from voice information inputted by a user of the client. The server obtains control information for operating the browser based on the character string in the query request message sent from the client, and the control information indicating one of a plurality results provided by the server including a direct URL based on the character string, a direct operation command based on the character string, and a search result page based on the character string. The server sends a query response message containing the control information to the client such that the client operates the browser based on the control information in response to the voice information inputted by the user.

Another aspect of the present disclosure includes a browser operation and control system. The system includes a server. The server is configured to receive a query request message from the a client. The client has a browser and the query request message includes a character string converted from voice information inputted by a user of the client. The server is also configured to obtain control information for operating the browser based on the character string in the query request message sent from the client. The control information indicates one of a plurality results provided by the server including a direct URL based on the character string, a direct operation command based on the character string, and a search result page based on the character string. Further, the server is configured to send a query response message containing the control information to the client such that the client operates the browser based on the control information in response to the voice information inputted by the user.

Another aspect of the present disclosure includes a browser operation and control system. The system includes a server and a client having a browser. The client is configured to receive voice information inputted by a user and convert the voice information to a character string, then to send a query request message to the server. The query request message includes the converted character string. The server is configured to receive the query request message from the client and obtain control information for operating the browser based on the character string in the query request message sent from the client. The control information indicates one of a plurality results provided by the server including a direct URL based on the character string, a direct operation command based on the character string, and a search result page based on the character string. The server is also configured to send a query response message containing the control information to the client such that the client operates the browser based on the control information in response to the voice information inputted by the user.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings.

Figure 4:
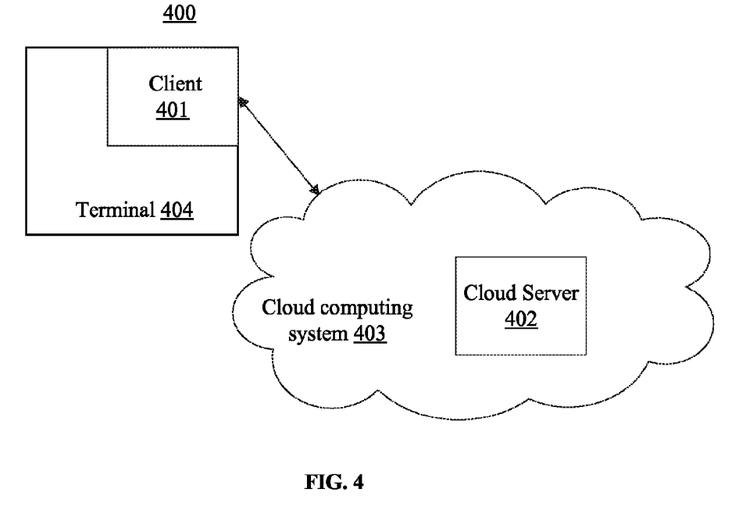
FIG. 4 illustrates an exemplary operating environment incorporating certain aspects of the disclosed embodiments.

FIG. 4 illustrates an exemplary operating environment 400 incorporating certain disclosed embodiments. As shown in FIG. 4, environment 400 may include a terminal 404 and a cloud computing system 403. The cloud computing system 403 may include various servers and other components to implement a cloud computing platform. For example, cloud computing system 403 may include cloud servers (e.g., physical or virtual server computers), networks (e.g., the Internet or other types of computer networks or telecommunication networks, either wired or wireless.), network storages, databases, operating systems (OS), programming language execution environments, and web servers, etc.

Cloud computing system 403 may include one or more cloud servers. Cloud server 402 may include any appropriate server computers configured to provide certain cloud-based server functionalities, such as a web server functionality for responding a user's request for web page operations or other application server. Although only one cloud server is shown, any number of cloud servers 402 can be included. Alternatively, the cloud server 402 may be operated in a non-cloud computing environment, and cloud computing system 403 may be an ordinary computer network providing communication channels for server 402 and terminal 404.

Terminal 404 may include any appropriate type of computing device, such as a personal computer, a mobile phone, a smart phone, a tablet, a notebook computer, or any type of computing platform. Terminal 404 may include one or more clients 401. The client 401, as used herein, may include any appropriate mobile application software, hardware, or a combination of application software and hardware to achieve certain client functionalities. For example, client 401 may include a browser, etc. According to actual needs in different terminals, a mobile client may be a browser installed in terminal for browsing, including various types of existing and future browser installed in terminals. Although only one client 401 is shown in the environment 400, any number of clients 401 may be included.

Figure 5:
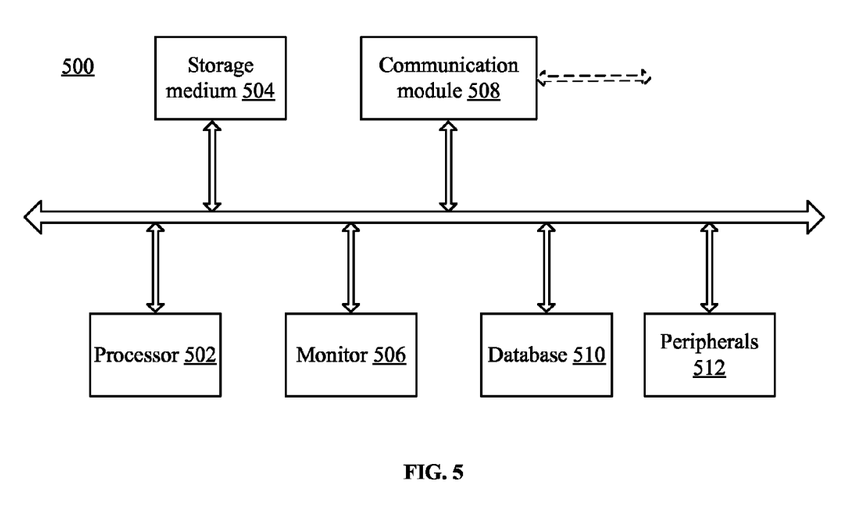
FIG. 5 illustrates a block diagram of an exemplary computing system according to the disclosed embodiments.

Terminal 404, client 401, and/or cloud server 402 may be implemented on any appropriate computing platform. FIG. 5 shows a block diagram of an exemplary computer system 500 capable of implementing terminal 404, client 401, and/or cloud server 402.

As shown in FIG. 5, computer system 500 may include a processor 502, a storage medium 504, a monitor 506, a communication module 508, a database 510, and peripherals 512. Certain devices may be omitted and other devices may be included.

Processor 502 may include any appropriate processor or processors. Further, processor 502 can include multiple cores for multi-thread or parallel processing. Storage medium 504 may include memory modules, such as ROM, RAM, flash memory modules, and erasable and rewritable memory, and mass storages, such as CD-ROM, U-disk, and hard disk, etc. Storage medium 504 may store computer programs for implementing various processes, when executed by processor 502.

Further, peripherals 512 may include I/O devices such as keyboard and mouse, and communication module 508 may include network devices for establishing connections through the communication network. Database 510 may include one or more databases for storing certain data and for performing certain operations on the stored data, such as database searching.

Figure 1:
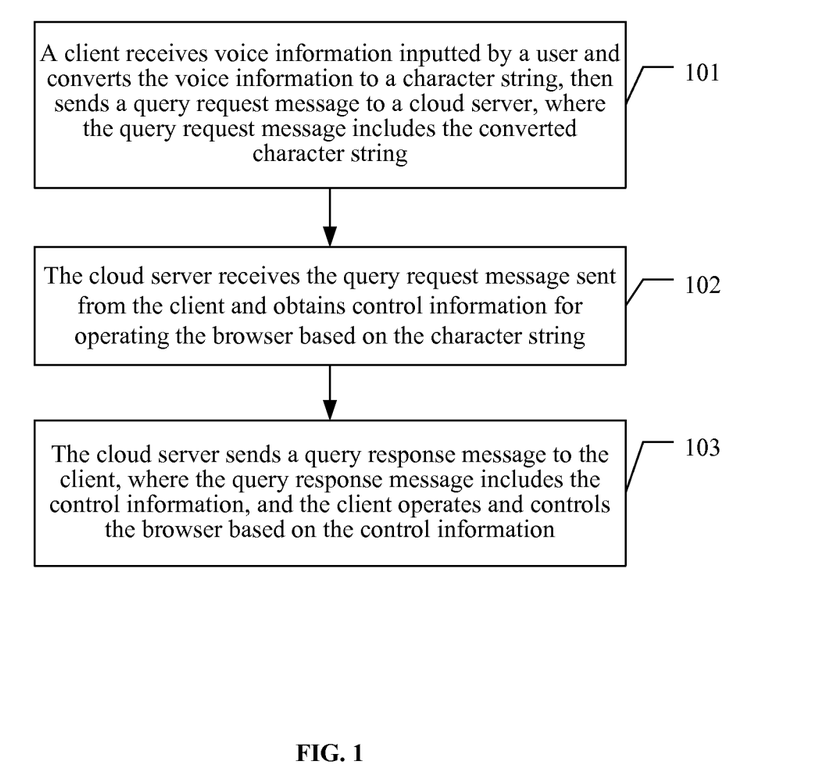
FIG. 1 illustrates a flow diagram of an exemplary browser operation and control process consistent with the disclosed embodiments.

In operation, client 401 and cloud server 402 may interact with each other to provide a web browsing service to the user(s) of the client 401. FIG. 1 illustrates a flow diagram of an exemplary browser operation and control process consistent with the disclosed embodiments.

As shown in FIG. 1, the browser operation and control process includes the following steps:

Step 101: a client receives voice information inputted by a user and converts the voice information to a character string, then sends a query request message to a cloud server, where the query request message includes the converted character string.

Step 102: the cloud server receives the query request message sent from the client and obtains control information for operating the browser based on the character string.

Step 103: the cloud server sends a query response message to the client, where the query response message includes the control information, and the client operates and controls the browser based on the control information.

That is, the client receives voice information inputted by the user and converts the voice information to the character string, and then sends a query request message to a cloud server. The query request message includes the converted character string. The cloud server receives the query request message sent from the client and obtains control information for operating the browser based on the character string. The cloud server sends a query response message to the client, and the query response message includes the control information. After the client receives the response message, the client operates and controls the browser based on the control information. Thus, the browser can be operated and controlled based on voice and/or Internet resources, greatly improving the efficiency for operating and controlling the browser.

Figure 2:
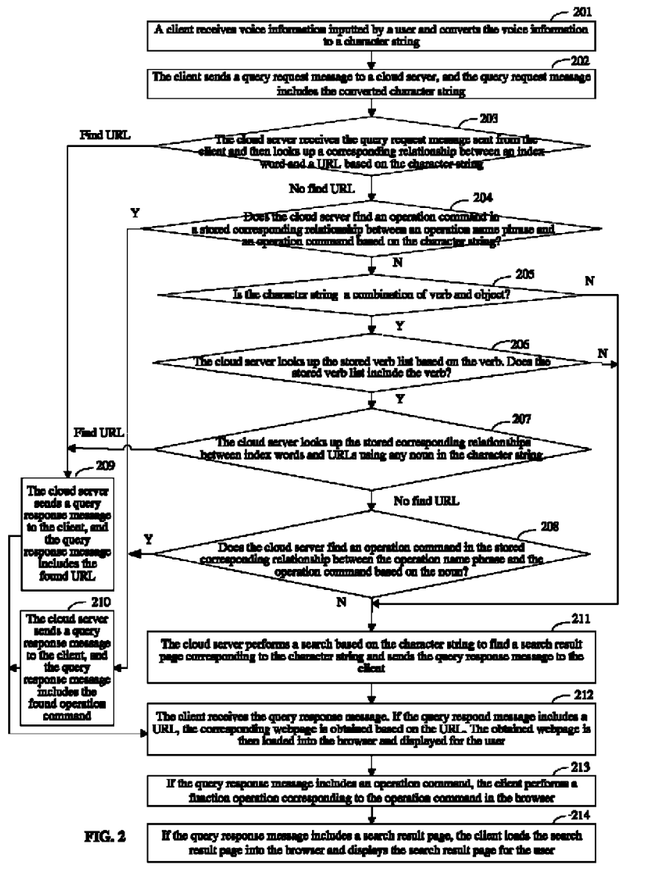
FIG. 2 illustrates a flow diagram of another exemplary browser operation and control process consistent with the disclosed embodiments.

FIG. 2 illustrates a flow diagram of another exemplary browser operation and control process consistent with the disclosed embodiments. As shown in FIG. 2, the process includes the following steps.

Step 201: a client receives voice information inputted by a user and converts the voice information to a character string.

When the client starts the browser, the user may trigger voice-controlled function from the client in the browser. For example, the user may keep pressing any location of the browser toolbar and, when time period for pressing the browser toolbar reaches a preset time period, the voice-controlled function in the browser is triggered. The user can then input voice into the client.

Further, the client may store locally a list of commonly used operations in advance. The list of commonly used operations includes operation name phrases and operation commands corresponding to the functional operations used commonly in the browser. For example, the list of commonly used operations is shown in Table 1.

TABLE 1

| List of commonly used operations | |
|---|---|
| Operation Name Phrase | Operation Command |
| Add A Bookmark, Bookmark This Page, Add To Bookmark | Command 1 |
| Refresh | Command 2 |
| Exit Browser | Command 3 |

Accordingly, when the client converts the received voice to a character string, the client may look up the list of commonly used operations as shown in Table 1 based on the character string. If the corresponding operation command is found, a function operation corresponding to the found command is performed in the browser, and then the operation process is ended. If the corresponding command is not found, the operation process goes to Step 202.

Step 202: the client sends a query request message to a cloud server, and the query request message includes the converted character string.

Step 203: the cloud server receives the query request message sent from the client and then looks up a stored corresponding relationship between an index word and a URL based on the character string. If the corresponding URL is found, the operation process goes to Step 209; otherwise, the operation process goes to Step 204. That is, if a match is found based on the character string, the corresponding URL is directly returned to the client such that the client can open the webpage of the returned URL immediately.

As used herein, an index word may include any appropriate word information related to a web resource (e.g., a web site). The cloud server may store website names, phrases related with website names, resource names, and phrases related with resource names as index words, and may also obtain the URL corresponding to each index word. Further, the cloud server may store each index word, its corresponding URL, and the corresponding relationship between the index word and the URL on the cloud server. In addition, the cloud server may constantly obtain new index words and the corresponding URLs and store the new index words, the corresponding URLs, and the corresponding relationship between the index words and the URLs on the cloud server.

For example, corresponding relationships between index words and URLs in the cloud server are shown in Table 2.

TABLE 2

Corresponding relationships between index words and URLs

| Index Word | URL |
| --- | --- |
| Tencent, Tencent Website, Open Tencent Website, QQ Website | URL 1 |
| Fruit Ninja | URL 2 |
| Jade Dynasty | URL 3 |
| Bank shot | URL 4 |
| Baby Bed, Snow Boots, Down Garment | URL 5 |
| Beijing Weather, Today's Temperature, Temperature, Wind Direction | URL 6 |
| ... | ... |

Step 204: the cloud server looks up a stored corresponding relationship between an operation name phrase and an operation command based on the character string. If the corresponding operation command is found, the operation process goes to Step 210; otherwise, the operation process goes to Step 205. That is, when a direct URL access is not found but a direct operation command is found, the operation command is return to the client such that the client can perform the operation command.

The cloud server stores, in advance, operation commands corresponding to functional operations of the browser and the operation name phrases related with the operation commands, and also stores the corresponding relationship between the operation name phrases corresponding to the functional operations and the operation commands corresponding to the functional operations.

For example, corresponding relationships between operation name phrases and operation commands in the cloud server are shown in Table 3.

TABLE 3

Corresponding relationships between operation name phrases and operation commands

| Operation Name Phrases | Operation Commands |
| --- | --- |
| Bookmark, Bookmark Page, Bookmark Webpage, History, History Record | Command 1 |
| Check Refresh, Refresh, I Want to Refresh | Command 2 |
| Exit, Close | Command 3 |
| Download, Download Management, File, File Management, File Manager | Command 4 |
| Night, Night Mode | Command 5 |
| Setting, Setting Page | Command 6 |
| Share, Share Page | Command 7 |
| Feedback, Feedback Suggestion, User Feedback | Command 8 |
| Help, Help Page | Command 9 |
| Full Screen, Full Screen Browsing | Command 10 |

Step 205: the cloud server performs a syntax analysis on the character string. If the analysis result shows that the character string is a verb-object combination, the operation process goes to Step 206; otherwise, the operation process goes to Step 211.

The cloud server may perform the syntax analysis on the character string by a syntax analysis algorithm. If the analysis result shows that the character string is a verb-object combination, the character string includes a verb and a noun. Alternatively, the cloud server may simply find any verb(s) and/or noun(s) in the character string for searching purposes.

Step 206: the cloud server divides the character string into a verb and a noun. The cloud server looks up the stored verb list based on the verb. If the verb list includes the verb, the operation process goes to Step 207; otherwise, the operation process goes to Step 211. The verb list includes at least: open, browse, view, enter, display, go, come, and get, etc. That is, the verb list includes actions to access a website or a webpage.

Step 207: the cloud server looks up the stored corresponding relationships between index words and URLs using any noun in the character string. If the corresponding URL is not found, the operation process goes to Step 208; otherwise, the operation process goes to Step 209.

Step 208: the cloud server looks up the stored corresponding relationship between the operation name phrase and the operation command based on the noun. If the corresponding operation command is found, the operation process goes to Step 210; otherwise, the operation process goes to Step 211.

Step 209: the cloud server sends a query response message to the client, and the query response message includes the found URL, and the operation process goes to Step 212.

Step 210: the cloud server sends a query response message to the client, and the query response message includes the found operation command, and the operation process goes to Step 212.

Step 211: the cloud server performs a search based on the character string to find a search result page corresponding to the character string and sends the query response message to the client, and the query response message includes the search result page.

Step 212: the client receives the query response message. If the query response message includes a URL, the corresponding webpage is obtained based on the URL. The obtained webpage is then loaded into the browser and displayed for the user.

Step 213: if the query response message includes an operation command, the client performs a function operation corresponding to the operation command of the browser.

Step 214: if the query response message includes a search result page, the client loads the search result page into the browser and displays the search result page for the user.

Thus, the client receives voice information inputted by the user and converts the voice information to the character string, then sends a query request message to a cloud server. The query request message includes the converted character string. The cloud server receives the query request message sent from the client and obtains control information for operating the browser based on the character string. The cloud server sends a query response message to the client, and the query response message includes the control information. The client operates and controls the browser based on the control information. Therefore, the browser can be controlled based on voice and network resources, greatly improving the control efficiency of the browser.

Figure 3:
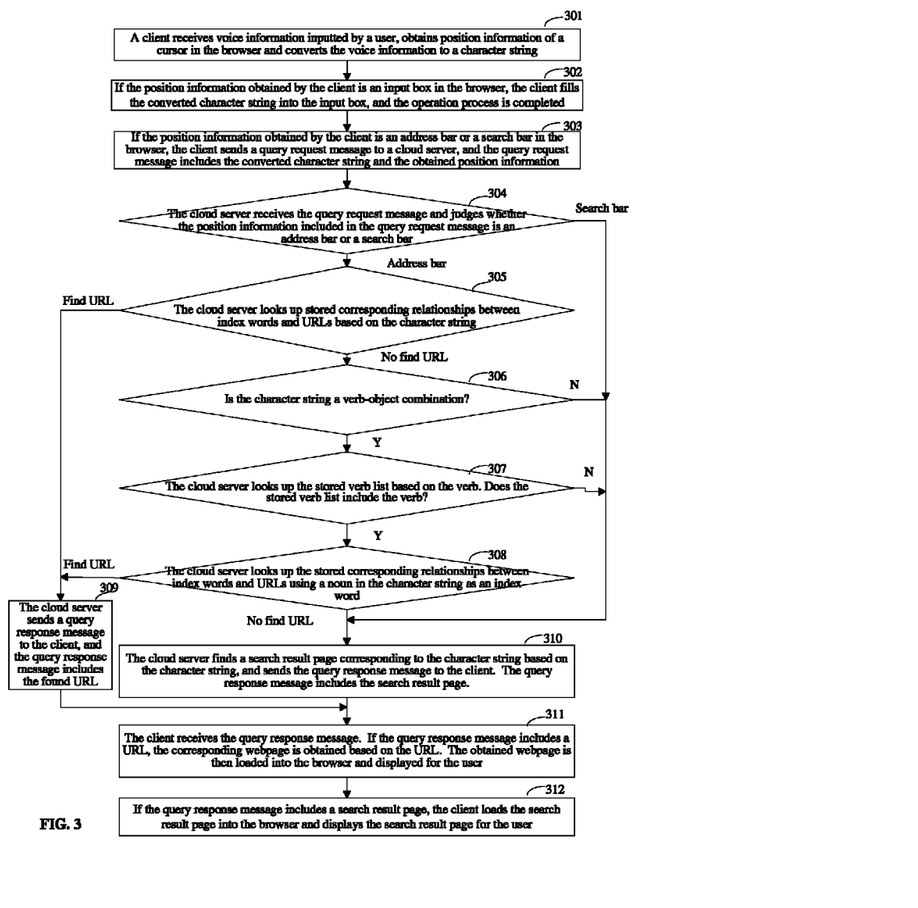
FIG. 3 illustrates a flow diagram of another exemplary browser operation and control process consistent with the disclosed embodiments.

FIG. 3 illustrates a flow diagram of another exemplary browser operation and control process consistent with the disclosed embodiments. As shown in FIG. 3, the operation and control process includes the following steps.

Step 301: a client receives voice information inputted by a user, obtains position information of a cursor in the browser, and converts the voice information to a character string. For example, the user may place the cursor in an address bar, a search bar, or an input box in the browser.

Step 302: if the position information obtained by the client is an input box in the browser, the client fills the converted character string into the input box in the browser, and the operation process is completed.

Step 303: if the position information obtained by the client is an address bar or a search bar in the browser, the client sends a query request message to a cloud server, and the query request message includes the converted character string and the obtained position information.

Step 304: the cloud server receives the query request message and judges whether the position information included in the query request message is an address bar or a search bar. If the position information included in the query request message is an address bar in the browser, the operation process goes to Step 305; if the position information included in the query request message is a search bar in the browser, the operation process goes to Step 310.

Step 305: the cloud server looks up stored corresponding relationships between index words and URLs based on the character string included in the query request message. If a corresponding URL is found, the operation process goes to Step 309; otherwise, the operation process goes to Step 306.

Step 306: the cloud server performs a syntax analysis on the character string. If the analysis result shows that the character string is a verb-object combination, the operation process goes to Step 307; otherwise, the operation process goes to Step 310.

The cloud server may perform the syntax analysis on the character string by an existing syntax analysis algorithm. If the analysis result shows that the character string is a verb-object combination, the character string includes at least a verb and a noun.

Step 307: the cloud server divides the character string into a verb and a noun. The cloud server looks up the stored verb list based on the verb. If the verb list includes the verb, the operation process goes to Step 308; otherwise, the operation process goes to Step 310. The verb list includes at least open, browse, view, enter, display, go, come, and get, etc.

Step 308: the cloud server looks up the stored corresponding relationships between the index words and the URLs using a noun in the character string as an index word. If the corresponding URL is found, the operation process goes to Step 309; otherwise, the operation process goes to Step 310.

Step 309: the cloud server sends a query response message to the client, and the query response message includes the found URL, and the operation process goes to Step 311.

Step 310: the cloud server finds a search result page corresponding to the character string based on the character string, and sends the query response message to the client. The query response message includes the search result page.

Step 311: the client receives the query response message. If the query response message includes a URL, the corresponding webpage is obtained based on the URL. The obtained webpage is then loaded into the browser and displayed for the user.

Step 312: if the query response message includes a search result page, the client loads the search result page into the browser and displays the search result page for the user.

Thus, the client receives voice information inputted by the user and converts the voice information to the character string, then sends a query request message to a cloud server. The query request message includes the converted character string. The cloud server receives the query request message sent from the client and obtains control information for operating the browser based on the character string. The cloud server sends a query response message to the client, and the query response message includes the control information. The client operates and controls the browser based on the control information. Therefore, the browser can be controlled based on voice and server resources, greatly improving the control efficiency of the browser.

Figure 6:
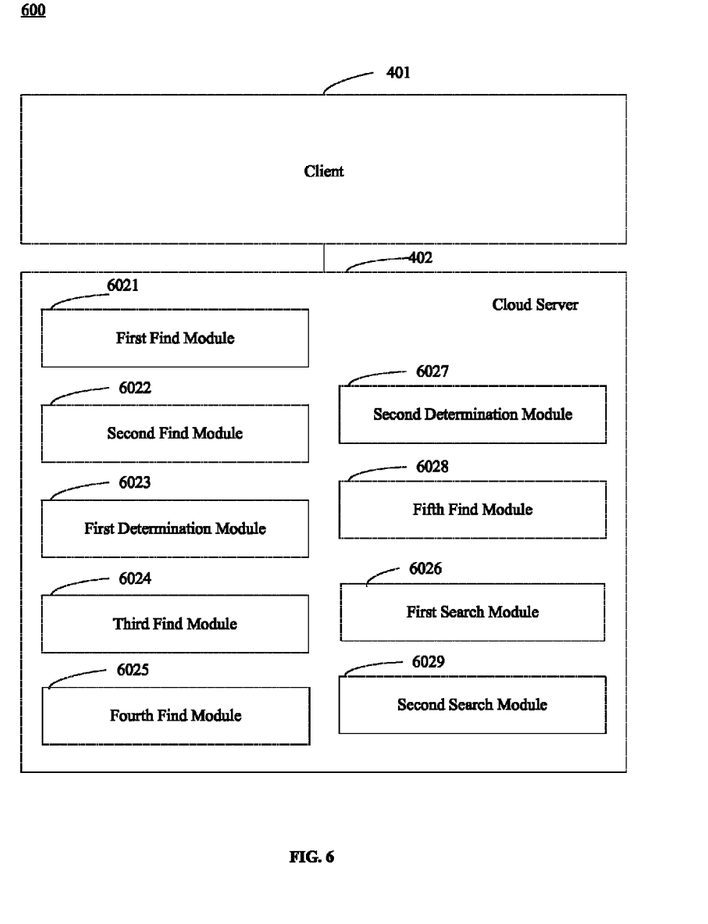
FIG. 6 illustrates a structure diagram of an exemplary browser operation and control system consistent with the disclosed embodiments.

FIG. 6 illustrates a structure diagram of an exemplary browser operation and control system 600 consistent with the disclosed embodiments. As shown in FIG. 6, the system 600 includes a cloud server 401 and a client 402.

The client 401 is configured to receive voice information inputted by a user and convert the voice information to a character string, then to send a query request message to the cloud server, wherein the query request message includes the converted character string.

The cloud server 402 includes a first find module 6021 and a second find module 6022. The first find module 6021 is configured to look up the stored corresponding relationship between an index word and a URL based on the character string. If the corresponding URL is found, the found URL is used as the control information.

The second find module 6022 is configured to look up a stored corresponding relationship between an operation name phrase and an operation command based on the character string when the URL corresponding to the character string is not found in the stored corresponding relationship between the index word and the URL. If the corresponding operation command is found, the found operation command is used as the control information.

Further, the cloud server 402 also includes a first determination module 6023 and a third find module 6024. The first determination module 6023 is configured to perform a syntax analysis on the character string if the URL corresponding to the character string is not found in the stored corresponding relationship between the operation name phrase and the operation command. If the analysis result shows that the character string is a verb-object combination, the character string is divided into a verb and a noun; the first determination module is also configured to determine whether a verb list includes the verb, and the verb list includes at least: open, browse, view, enter, display, go, come, and get;

The third find module 6024 is configured to look up stored corresponding relationships between index words and URLs using any noun in the character string if the verb list includes the verb. If the corresponding URL is found, the URL is used as the control information.

Further, the cloud server 402 also includes a fourth find module 6025 and a first search module 6026. The fourth find module 6025 is configured to look up a corresponding relationship between the operation name phrase and the operation command based on the noun if the URL corresponding to the noun is not in a stored corresponding relationship between the index word and the URL. If the corresponding operation command is found, the operation command is used as the control information.

The first search module 6026 is configured to perform a search based on the character string to find a search result page corresponding to the character string. If the character string is not a verb-noun combination or the operation command corresponding to the noun is not in a stored corresponding relationship between the operation name phrase and the operation command, and then the corresponding search result page is used as the control information.

Further, the client 401 is also configured to obtain position information of a cursor in the browser. The query request message includes the position information.

Further, the cloud server 402 also includes a second determination module 6027, a fifth find module 6028, and a second search module 6029. The second determination module 6027 is configured to determine the position information.

The fifth find module 6028 is configured to look up stored corresponding relationships between index words and URLs based on the character string if the position information is the address bar in the browser. If a corresponding URL is found, the URL is used as the control information.

The second search module 6029 is configured to perform a search based on the character string to find a search result page corresponding to the character string if the position information is the search bar in the browser, and the corresponding search result page is used as the control information.

Thus, the client receives voice information inputted by the user and converts the voice information to the character string, then sends a query request message to a cloud server. The query request message includes the converted character string. The cloud server receives the query request message sent from the client and obtains control information for operating the browser based on the character string. The cloud server sends a query response message to the client, and the query response message includes the control information. The client operates and controls the browser based on the control information. Therefore, the browser can be controlled based on voice and server resources, greatly improving the control efficiency of the browser.

The disclosed method and system may be embodied in hardware directly, in software modules executed by the processor, or in a combination of both. The software modules can reside in RAM memory, flash memory, ROM memory, EPROM memory, EEPROM memory, registers, hard disk, removable disk, the CD-ROM, or any other form of storage medium known in the field. The storage medium can be coupled to the processor, such that the processor can read information from the storage medium and write information to the storage medium.

Those skilled in the art understand that various improvements can be made to the above described method and system according to the present invention, without departing from the contents of the present invention. Therefore, the scope of the present invention should be defined by the attached claims.

What is claimed is:

1. A browser operation and control method provided between a server and a client having a browser, comprising:
   obtaining, by the client, a position information of a cursor in the browser, the position information of the cursor in the browser comprising an address bar, a search bar, or an input box in the browser;
   receiving, by the server, a query request message from the client, wherein the query request message contains the position information obtained by the client and a character string converted by the client from voice information inputted by a user of the client;
   obtaining, by the server, control information for operating the browser based on the character string and the position information in the query request message sent from the client, wherein the control information indicates one of a plurality of results provided by the server including a direct URL based on the character string and the position information and a search result page based on the character string and the position information; and
   sending, by the server, a query response message containing the control information to the client such that the client operates the browser based on the control information in response to the voice information inputted by the user and the position information of the cursor in the browser.

2. The method according to claim 1, wherein obtaining the control information for operating the browser based on the character string further includes:
   when the position information is an address bar in the browser;
   looking up, by the server, a stored corresponding relationships between index words and a URLs using the character string as an index word to find a corresponding first URL; and
   using the first URL as the control information when the first URL is found.

3. The method according to claim 2, wherein obtaining the control information for operating the browser based on the character string further includes:
   when the first URL corresponding to the character string is not found in the stored corresponding relationships between index words and URLs:
   performing a syntax analysis on the character string;
   dividing the character string into a at least one verb and a at least one noun, when the analysis indicates that the character string is a verb-object combination;
   looking up the at least one verb in a verb list;
   determining whether the verb list includes the at least one verb, wherein the verb list includes at least: open, browse, view, enter, display, go, come, and get;
   looking up the stored corresponding relationships between index words and URLs using the at least one noun in the character string as an index word to find a corresponding second URL, when the verb list includes the at least one verb; and
   using the second URL as the control information when the corresponding second URL is found.

4. The method according to claim 3, wherein obtaining the control information for operating the browser based on the character string further includes:
   when the position information is a search bar in the browser, or when the character string is not a verb-object combination, or when the corresponding second URL is not found:
   performing a search based on the character string to find a search result page corresponding to the character string; and
   using the corresponding search result page as the control information.

5. A browser operation and control system, comprising:
   a server including one or more processors, memory, and one or more program modules stored in the memory and to be executed by the one or more processors, the one or more program modules being configured to:
   receive a query request message from a client having a browser, wherein the query request message includes a character string converted from voice information inputted by a user of the client, the client being a computation system including at least a processor and a memory,
   wherein the client is configured to obtain a position information of a cursor in the browser and to include the position information in the query request message containing the converted character string, before the client sends the query request message to the server, wherein the position information of the cursor in the browser comprises an address bar, a search bar, or an input box in the browser;
   obtain control information for operating the browser based on the character string and the position information in the query request message sent from the client, wherein the control information indicates one of a plurality of results provided by the server including a direct URL based on the character string and the position information and a search result page based on the character string and the position information; and
   send a query response message containing the control information to the client such that the client operates the browser based on the control information in response to the voice information inputted by the user and the position information of the cursor in the browser.

6. The system according to claim 5, wherein the one or more program modules on the server further include:
   a first find module configured to, when the position information is an address bar in the browser:
   look up stored corresponding relationships between index words and a URLs using the character string as an index word to find a corresponding first URL; and
   when the corresponding first URL is found, use the found first URL as the control information.

7. The system according to claim 6, wherein the one or more program modules on the server further include:
   a first determination module configured to, when the first URL corresponding to the character string is not found in the stored corresponding relationships between index words and URLs:
   perform a syntax analysis on the character string; and
   when the analysis shows that the character string is a verb-object combination, divide the character string into a at least one verb and a at least one noun; and determine whether the at least one verb is included in a verb list containing at least the words: open, browse, view, enter, display, go, come, and get; and
   a third find module configured to
   look up the stored corresponding relationships between index words and URLs, using the at least one noun in the character string as an index word to find a corresponding second URL when the verb list includes the at least one verb; and
   when the corresponding second URL is found, use the second URLs as the control information.

8. The system according to claim 7, wherein the one or more program modules on the server further include:
   a first search module configured to, when the position information is a search bar in the browser, or when the character string is not a verb-object combination, or when the corresponding second URL is not found:
   perform a search based on the character string to find a search result page corresponding to the character string; and
   use the corresponding search result page as the control information.

9. A browser operation and control system, comprising:
   a server; and a client coupled to the server and having a browser, wherein:
   the client is a computation system including at least a processor and a memory, and is configured to:
   receive voice information inputted by a user;
   convert the voice information to a character string;
   obtain a position information of a cursor in the browser, the position information of the cursor in the browser comprising an address bar, a search bar, or an input box in the browser; and
   send a query request message to the server, wherein the query request message includes the converted character string and the obtained position information; and
   the server includes one or more processors, memory, and one or more program modules stored in the memory and to be executed by the one or more processors, the one or more program modules being configured to:
   receive the query request message from the client;
   obtain control information for operating the browser based on the character string and the position information in the query request message sent from the client, wherein the control information indicating one of a plurality of results provided by the server including a direct URL based on the character string and the position information and a search result page based on the character string and the position information; and
   send a query response message containing the control information to the client such that the client operates the browser based on the control information in response to the voice information inputted by the user and the position information of the cursor in the browser.

10. The system according to claim 9, wherein the one or more program modules on the server further include:
    a first find module configured to, when the position information is an address bar in the browser:
    look up a stored corresponding relationships between an index words and a URLs using the character string as an index word to find a corresponding URL;
    when the corresponding URL is found, use the found URL the control information.

11. The system according to claim 10, wherein the one or more program modules further include:
    a second search module configured to, when the position information is a search bar in the browser:

perform a search based on the character string to find a search result page corresponding to the character string; and
use the corresponding search result page as the control information.

* * * * *